United States Patent [19]
Wardavoir

[11] Patent Number: 5,410,980
[45] Date of Patent: May 2, 1995

[54] AMPHIBIOUS MOTOR VEHICLE CHASSIS AND VEHICLE INCLUDING SUCH A CHASIS

[75] Inventor: Francois Wardavoir, Cellettes, France

[73] Assignee: Hobbycar, Thenay, France

[21] Appl. No.: 128,680

[22] Filed: Sep. 30, 1993

[30] Foreign Application Priority Data

Oct. 5, 1992 [FR] France .................. 92 11771

[51] Int. Cl.6 ............................................. B63B 38/00
[52] U.S. Cl. .................................. 114/270; 280/781; 280/783
[58] Field of Search .............. 114/270; 280/781, 783, 280/785, 792

[56] References Cited

U.S. PATENT DOCUMENTS

| | | |
|---|---|---|
| 1,677,846 | 7/1928 | Powell . |
| 1,823,207 | 9/1931 | Matieson . |
| 2,397,791 | 4/1946 | Kramer et al. . |
| 2,669,462 | 2/1954 | Toncray et al. ............... 280/785 |
| 3,444,837 | 5/1969 | Donofrio .................... 114/270 |

FOREIGN PATENT DOCUMENTS

| | | |
|---|---|---|
| 2620395 | 3/1989 | France . |
| 2134857 | 8/1984 | United Kingdom . |

*Primary Examiner*—Sherman Basinger
*Attorney, Agent, or Firm*—Young & Thompson

[57] ABSTRACT

The invention relates to an amphibious motor vehicle chassis including a central box structure (74), at least one front longitudinal member (77) and at least one rear longitudinal member (78) to define two lateral spaces on each side of each longitudinal member. This chassis includes a main internal structure (2) placed inside a sealed hull (19) and external structural elements (3, 4, 5) extending outside the hull (19).

21 Claims, 6 Drawing Sheets

FIG_1

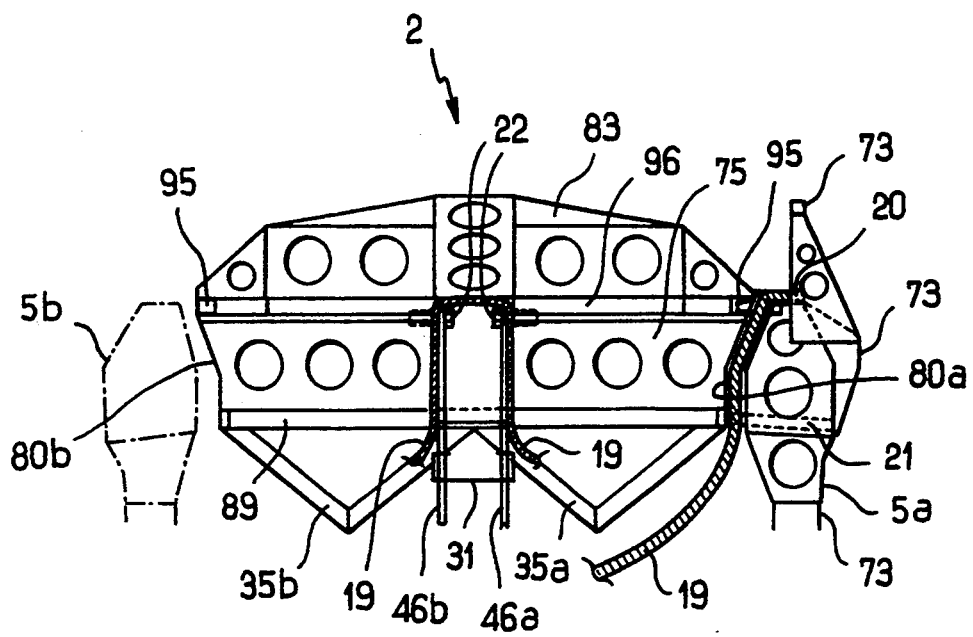
FIG_4
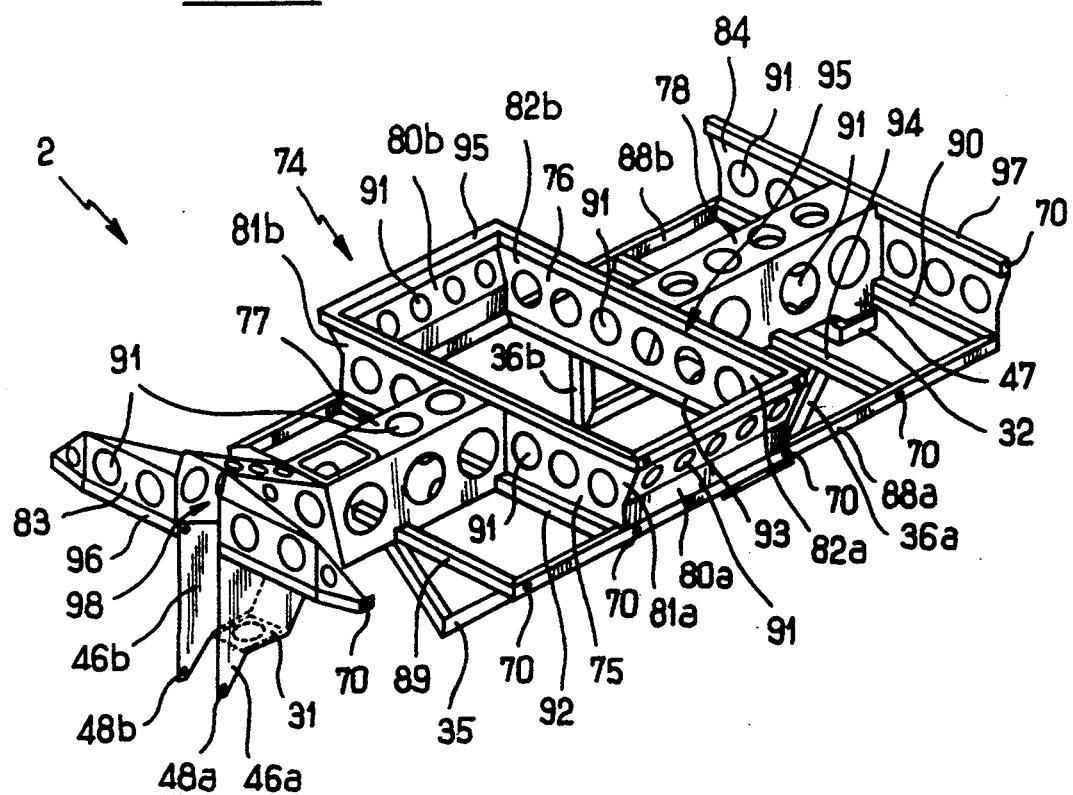
FIG_3

AMPHIBIOUS MOTOR VEHICLE CHASSIS AND VEHICLE INCLUDING SUCH A CHASIS

The invention relates to an amphibious motor vehicle chassis.

Up until the present, the design of amphibious vehicles has been produced either on the basis of a conventional motor vehicle to which are added hull elements and multiple sealing means, or of a conventional boat structure to which are added terrestrial transmission means.

In the first case, the addition of hull elements and of sealing means is delicate, expensive, and problematical. As a result, sealing is not very reliable. In addition, since the vehicle is basically designed as a terrestrial vehicle, its behavior in and on the water is not satisfactory, unless balancing elements or structural elements are added which make the assembly heavier and add to the cost of the vehicle.

In the second case, the ship structure generally proves insufficiently rigid and suitable for the road behavior of the vehicle, which is not satisfactory.

The invention therefore aims to overcome these drawbacks by providing an amphibious vehicle chassis specially designed from the start to satisfy, on the one hand, the mechanical constraints of the road behavior of the vehicle and, on the other hand, to provide satisfactory behavior of the vehicle on the water.

The invention aims in particular to provide such a chassis which is sufficiently rigid to carry the motor unit, the transmission elements, the accessories and the occupants whilst providing good roadholding by the vehicle, whilst at the same time being sufficiently lightweight and balanced to provide satisfactory behavior on the water.

The invention also aims to provide such a chassis which makes it possible to arrange a motor unit in a central position with respect to the axles of the vehicle, and seat places for passengers distributed symmetrically around the motor unit.

The invention also aims to provide such a chassis suitable for producing an amphibious open air vehicle with seat backs which can be folded down, as described in French Patent FR-A-2,620,395.

The invention also aims to provide such a chassis of which the weight and the cost price are both as low as possible.

To do this, the invention relates to an amphibious motor vehicle chassis wherein it includes a central box structure for receiving a motor unit defined at least toward the front and/or toward the rear by two central transverse members—that is to say a front central transverse member and a rear central transverse member—at least one front longitudinal member and at least one rear longitudinal member with are respectively rigidly joined to each transverse member of the central box structure to define two lateral spaces corresponding to seat places on each side of each longitudinal member to the front and to the rear of the central box structure.

A chassis according to the invention includes the same number of front longitudinal members and of rear longitudinal members, the front longitudinal members and rear longitudinal members extending in pairs along the same longitudinal direction of the vehicle. In one embodiment, and according to the invention, the chassis includes a front longitudinal member and a rear longitudinal member extending in the median longitudinal direction of the vehicle on either side of the central box structure.

The central transverse members are connected to one another by two lateral longitudinal members extending between the ends of the central transverse members, to join them together by extending them over the same height, so as to form the central box structure.

According to the invention, each front and rear longitudinal member consists of a beam produced overall from a plate of sheet metal folded along longitudinal fold lines. Each front and rear longitudinal member therefore consists of a hollow beam possibly provided with transverse reinforcing walls. Each front and rear longitudinal member has a right transverse section of the same height as that of the central transverse member to which it is rigidly joined, and this right transverse section of each front and rear longitudinal member is in the shape of a U, rectangle, or square.

Each central transverse member of the central box structure overall consists of a plate of sheet metal couched on edge so as to form a vertical transverse wall extending over the entire width of the vehicle.

The chassis according to the invention also includes an extreme front transverse member rigidly joined to the front end of a front longitudinal member, and an extreme rear transverse member rigidly joined to the rear end of a rear longitudinal member.

According to the invention, the central box structure, the front and rear longitudinal members and the extreme transverse members consist of plates of sheet metal which are folded and perforated.

The chassis according to the invention also includes a tubular lower skeleton rigidly joined under the central box structure, the longitudinal members and the transverse members. This tubular lower skeleton serves as a reinforcement for the floor, as anchorage for the suspension cradles described hereafter, and reinforces the chassis in torsion about the longitudinal direction. The tubular lower skeleton includes an overall rectangular frame and transverse reinforcements. Two transverse reinforcements extend respectively under the central transverse members, and the lateral longitudinal members rest on longitudinal sides of the frame formed by the lower tubular skeleton. Moreover, the lower tubular skeleton includes front and rear brackets for anchoring a front axle cradle and a rear axle cradle respectively.

A chassis according to the invention is therefore perfectly balanced, rigid, and makes it possible to arrange a motor unit in a central position and seat places distributed evenly around this motor unit.

Moreover, the invention also aims to provide an amphibious motor chassis in which the penetrations through the sealed hull are kept to a minimum, particularly for the transmissions shafts. The invention also aims to provide such a chassis which nevertheless makes it possible to withstand satisfactorily from the mechanical stresses point of view, front and rear axles and the wheels of the vehicle. What is more, the invention also aims to provide such a chassis by virtue of which the fixing of the hull with respect to the structure of the chassis is simple, rigid, and optimum from the point of view of the sealing, safety and rigidity of the assembly.

The invention also aims to provide such a chassis which is moreover compatible with the features and constraints mentioned hereinabove.

To do this, the invention provides an amphibious motor vehicle chassis, wherein it includes a main internal structure placed inside a sealed hull, and external structural elements extending outside the hull and rigidly joined to the main internal structure through the hull by sealed means for rigid joining.

According to the invention, the external structural elements carry the axles, the wheels and the suspensions of the vehicle. Also, the external structural elements according to the invention carry at least one fuel tank.

According to the invention, the hull is rigidly joined to the main internal structure by the sealed means for rigid joining which include clamping means for wedging the hull between the external structural elements and the main internal structure. According to the invention, the sealed means for rigid joining are point means for rigid joining, particularly using bolting.

According to the invention, the external structural elements include two longitudinal lateral beams, each longitudinal lateral beam being rigidly joined to the main internal structure by each of its front and rear ends and by its central part. The central part of each longitudinal lateral beam is rigidly joined to each central transverse member of the central box structure. What is more, according to the invention, each longitudinal lateral beam is rigidly joined to each transverse member of the main internal structure, that is to say to the central transverse members of the central box structure and to each extreme transverse member. Each longitudinal lateral beam carries the shock absorbers of the vehicle wheel and each wheel shock absorber is fixed inside a hollow longitudinal lateral beam and is connected to an at least substantially vertical suspension arm carrying a wheel by means of a rocker joined so that it can rotate freely with respect to the longitudinal lateral beam about a horizonal transverse spindle. Each longitudinal lateral beam also carries a fuel tank—particularly a flexible tank—built in inside each longitudinal lateral hollow beam.

According to the invention, the external structural elements also include a front cradle and a rear cradle, each cradle being rigidly joined under the main internal structure and carry suspension linkages for the wheels. Each cradle also carries a transmission differential connected to a primary transmission shaft passing through the hull coming from a motor unit, two secondary transmission shafts with universal joints transmitting the movement to the wheels from the differential.

Moreover, the hull of a chassis according to the invention may also be joined by bonding or welding to the main internal structure and/or to external structural members. In particular, the hull is joined by bonding with each longitudinal side of the frame formed by the lower tubular skeleton of the main internal structure.

The invention also relates to an amphibious motor vehicle wherein it includes a chassis according to the invention. The vehicle according to the invention includes bodywork surrounding the chassis and rigidly joined to the upper part of the main internal structure and to the external structural elements.

The invention also relates to an amphibious motor vehicle chassis and to an amphibious motor vehicle including, in combination, all or some of the features mentioned hereinabove or hereinbelow.

Other advantages and features of the invention will emerge upon reading the following description which refers to the appended figures in which:

FIG. 3 is a perspective view of the main structure of a chassis according to the invention.

FIG. 4 is a front view of FIG. 2.

FIG. 10 is a detailed sectional view of the means for joining a longitudinal lateral beam to the main structure of a chassis according to the invention.

Figure 1:
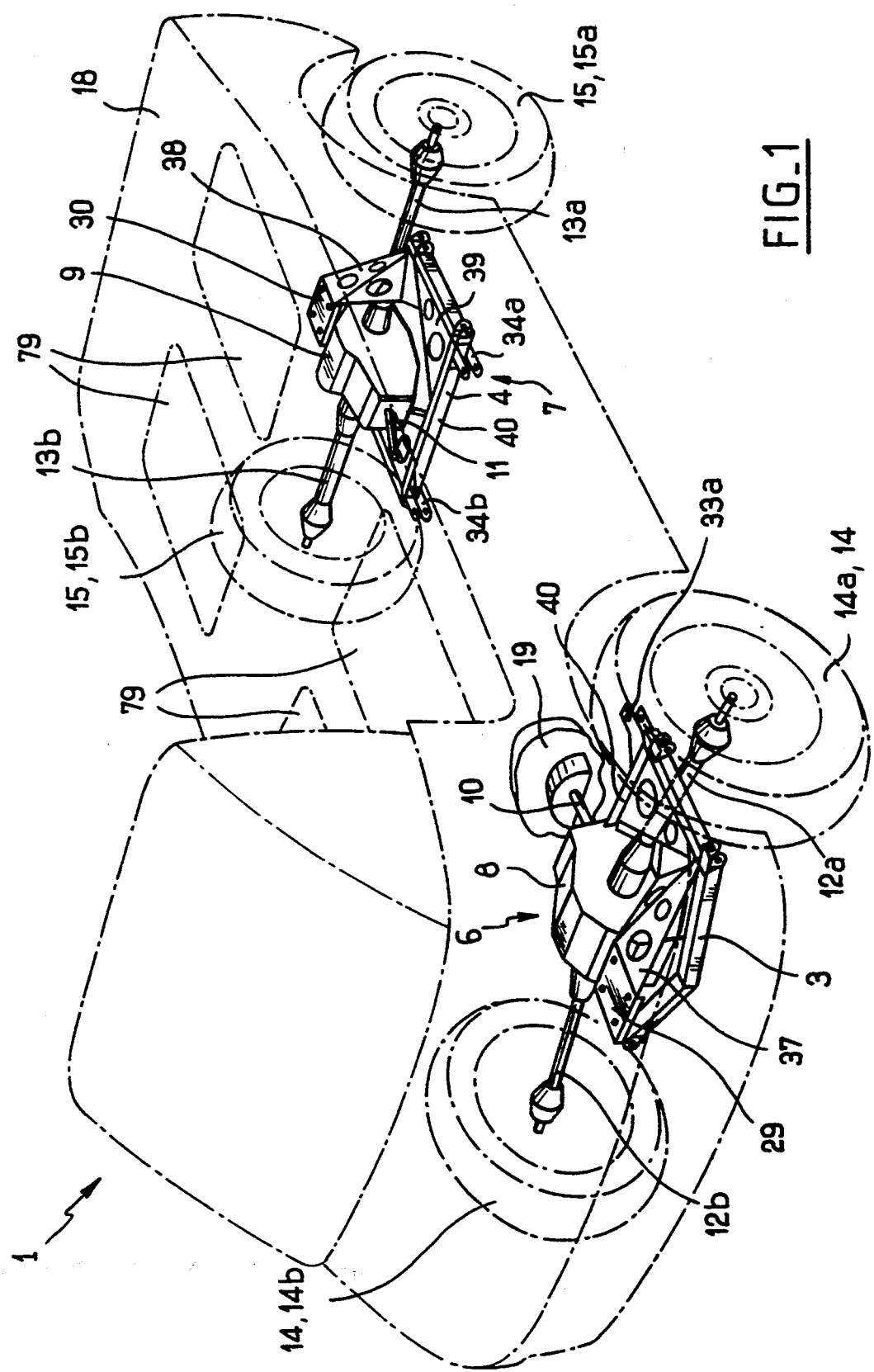
FIG. 1 is an overall perspective view illustrating the external appearance of a vehicle according to the invention.

FIG. 1 represents the overall external appearance of a vehicle 1 according to the invention comprising a chassis 2, 3, 4, 5 according to the invention. In the example shown, the vehicle 1 is an amphibious open air vehicle comprising four seat places, evenly distributed, two at the front of a motor unit located in a central position, and two at the rear of the motor unit. The vehicle 1 moreover includes two axles, namely a front axle 6 and a rear axle 7. The two axles are driving axles and are joined by a front transmission differential axle assembly 8, and a rear transmission differential axle assembly 9 respectively, to the motor unit in a central position by virtue of a front transmission primary shaft 10, and a rear transmission primary shaft 11, respectively. Each transmission differential 8, 9 is connected to two secondary transmission shafts 12a, 12b, 13a, 13b with universal joints transmitting the movement to the wheels 14a, 14b, 15a, 15b. The front transmission differential 8 is carried by a front cradle 3, and the rear transmission differential 9 is carried by a rear cradle 4. In FIG. 1, the outer bodywork 18 is represented diagrammatically in chain line.

Figure 5:
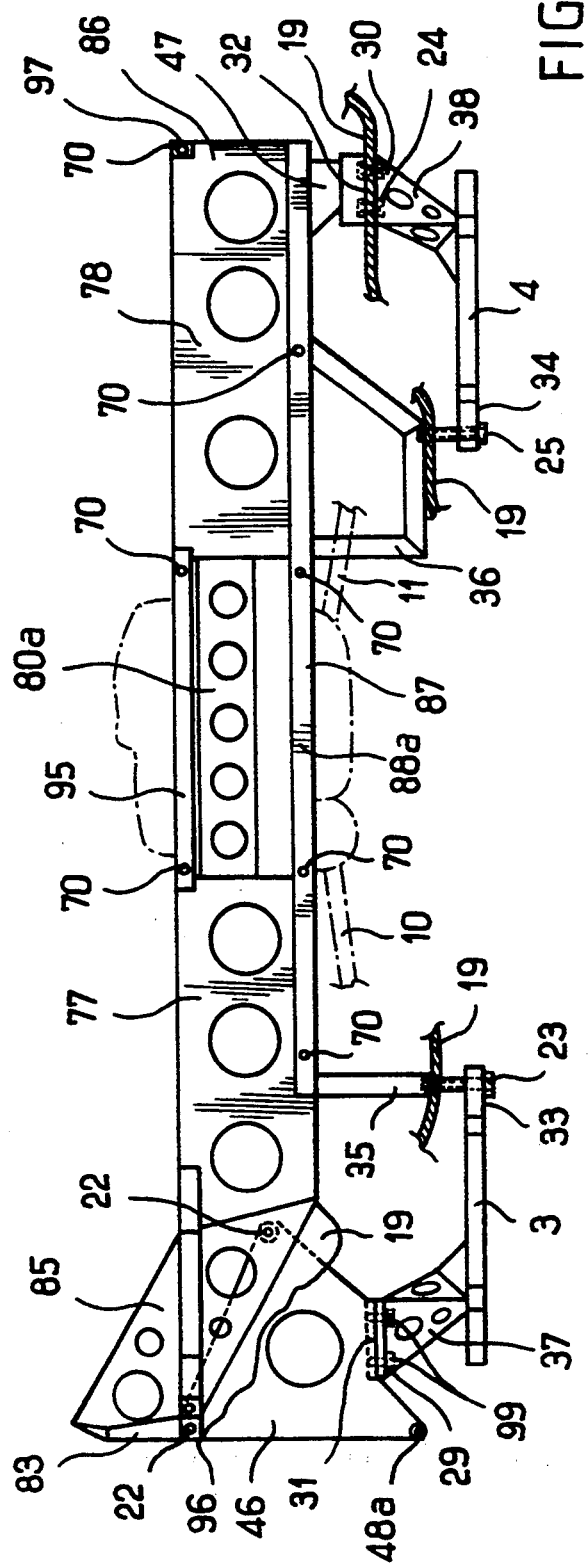
FIG. 5 is a side view of a main structure equipped with the front and rear cradles, of a chassis according to the invention.
Figure 6:
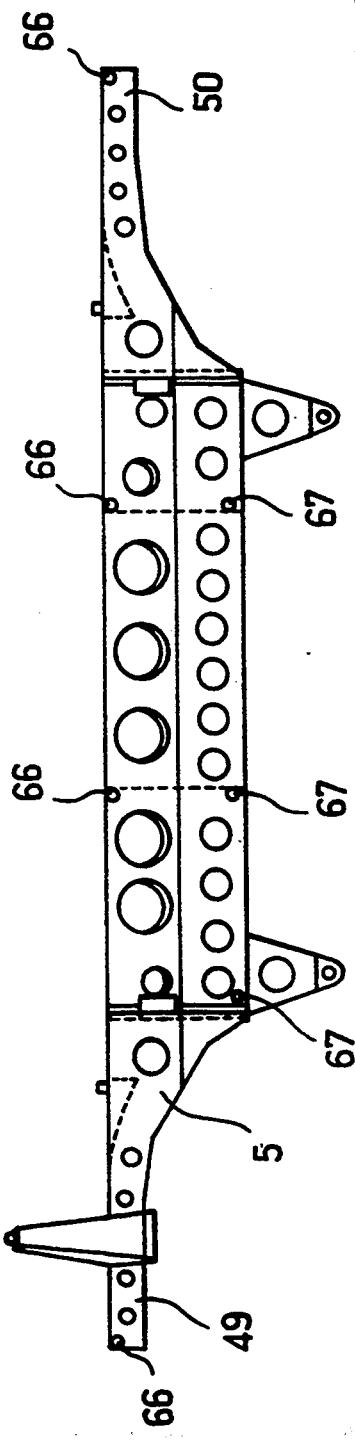
FIG. 6 is a side view of a longitudinal lateral beam of a chassis according to the invention.

The amphibious motor vehicle chassis according to the invention includes a central box structure 74 for receiving a motor unit, represented diagrammatically in chain line in FIG. 5. The central box structure 74 is delimited by two central transverse members 75, 76, namely a front central transverse member 75 and a rear central transverse member 76. The chassis also includes at least one front longitudinal member 77 and at least one rear longitudinal member 78 extending along a longitudinal axis of the vehicle and which are rigidly joined respectively to each transverse member 75, 76 of the central box structure to define two laterals paces 79 corresponding to seat places on each side of each longitudinal member 77, 78 at the front and at the rear of the central box structure 74. The front longitudinal member 77 is therefore fixed to the front central transverse member 75 from which it extends toward the front longitudinally and the rear longitudinal member 78 and is fixed to the rear central transverse member 76 from which it extends longitudinally toward the rear. Depending on the number of seat places and the bulk, in terms of width, which it is desired to give the vehicle, several front longitudinal members 77 and several rear longitudinal members 78 may be provided, parallel to one another. According to the invention, the chassis includes the same number of front longitudinal members 77 and of rear longitudinal members 78, the front longitudinal members 77 and rear longitudinal members 78 extending in pairs in the same longitudinal direction of the vehicle. Thus, each rear longitudinal member 78 is extended towards the front beyond the central box structure 74 by a front longitudinal member 77 with the same longitudinal direction. In the embodiment shown according to the invention the chassis includes just one front longitudinal member 77 and one rear longitudinal member 78, extending in the median longitudinal direction of the vehicle on either side of the central box structure 74.

The central transverse members 75, 76 are connected to one another by two lateral longitudinal members 80a, 80b extending between the ends 81a, 82a, 81b, 82b of the central transverse members 75, 76 to join them together by extending them over the same height, so as to form the central box structure 74. Thus, the central box structure 74 is overall in the shape of a right prism with a rectangular base, the upper and lower faces of which are open. In fact, a chassis according to the invention does not include a horizontal wall or a floor participating in its rigidity. Thus, the central box structure 74 does not have a lower or upper horizontal wall and therefore defines a central vertical housing opening out at the top and at the bottom. In the embodiment shown, the lateral longitudinal members 80a, 80b nevertheless have a right transverse section which is flared out towards the top and towards the outside to increase the volume available for the motor at the upper part of the central box structure 74.

According to the invention, each front and rear longitudinal member 77, 78 consists of a beam produced overall from a plate of sheet metal folded along longitudinal fold lines, and has a right transverse section of the same height as that of the central transverse member 75, 76, to which it is rigidly joined. This right transverse section may be in the shape of a U, rectangle, square or some other shape.

Moreover, each central transverse member 75, 76 overall consists of a plate of sheet metal couched on edge so as to form a vertical transverse wall extending over the entire width of the vehicle.

Moreover, the chassis according to the invention includes an extreme front transverse member 83 rigidly joined to the front end 85 of a front longitudinal member 77, and an extreme rear transverse member 84 rigidly joined to the rear end 86 of a rear longitudinal member 78. The extreme rear transverse member 84 is produced in a similar way to the rear central transverse member 76, in the form of a plate of sheet metal couched on edge. The extreme front transverse member 83 is also produced essentially in the form of a plate of sheet metal couched on edge, but folded along fold lines to improve the aerodynamic shape of the vehicle 1.

According to the invention, the central box structure 74, the front and rear longitudinal members 77, 78, the central transverse members 75, 76, the lateral longitudinal members 80a, 80b, and the extreme transverse members 83, 84 consist of plates of sheet metal which are folded and perforated by evenly distributed slots 91 the position, the shapes and the dimensions of which are determined as a function of the mechanical stresses endured for the purpose of optimally lightening the chassis. Preferably, these slots 91 are circular. According to the invention all the elements of the chassis formed of plates of sheet metal include, as far as possible, slots 91.

Moreover, the chassis according to the invention includes a tubular lower skeleton 87 rigidly joined under the central box structure 74, the front, rear or lateral longitudinal members 77, 78, 80a, 80b and the extreme transverse members 83, 84. This tubular skeleton 87 allows the fixing of accessory elements of the vehicle, the arrangement of a floor delimiting the seat places at the bottom, the anchoring of the front and rear cradles 3, 4 and rigidifies the chassis according to the invention, particularly in torsion about a longitudinal axis. The lower skeleton 84 includes an overall rectangular peripheral frame consisting of two longitudinal sides 88a, 88b of a front side 89 and of a rear side 90. The lower skeleton 87 also includes transverse reinforcements 89, 92, 93, 94. According to the invention, two central transverse reinforcements 92, 93 extend under the central transverse members 75, 76 forming the central box structure 74, namely a front central transverse reinforcement 92 and a rear central transverse reinforcement 93. Moreover, the lateral longitudinal members 80a, 80b of the central box structure 74 rest on the longitudinal sides 88a, 88b of the frame formed by the lower tubular skeleton 87. The lower tubular skeleton 87 also includes a rear transverse reinforcement 94 extending transversely under the rear longitudinal member 78. What is more the front transverse side 89 of the frame formed by the skeleton 87 extends transversely under the front longitudinal member 77. The extreme rear transverse member 84 rests on the extreme transverse rear side 90 of the frame formed by the skeleton 87. The rear transverse reinforcement 94 and the front side 89 of the skeleton 87 extend at least substantially under the median part of the longitudinal members 77, 78 to which they are rigidly joined.

Moreover, the lower tubular skeleton 87 includes front and rear brackets 35, 36 for anchoring a front cradle 3 and a rear cradle (4). More precisely, the tubular skeleton 87 includes a left front anchoring bracket 35a for a left attachment lug 33a of the front cradle 3, a right front bracket 35b for a right attachment lug 33b for the front cradle 3, a left rear anchoring bracket 36a for a left attachment lug 34a of the rear cradle 4, and a right rear anchoring bracket 36b for a right attachment lug 34b of the rear cradle 4. Each front bracket 35 consists of two tubes connected together to form a V extending in a transverse plane under the front side 89, the apex being directed downwards and receiving the corresponding attachment lug 33. Each rear attachment 36 consists of three tubes connected together to form a lower stirrup extending under the rear central transverse reinforcement 93 and under the rear transverse reinforcement 94. Each rear anchoring bracket 36 therefore includes a verticle arm extending under the rear central transverse reinforcement 93, a horizontal arm horizontally extending the free end of this vertical arm and an arm inclined toward the rear and upward to join up with the rear reinforcement 94 (FIG. 5).

The chassis according to the invention also includes an upper rectangular tubular frame 95 rigidly joined to and extending above the central box structure 74, that is to say above the central transverse members 75, 76 and the lateral longitudinal members 80a, 80b. Also, a reinforcing tube 96 is provided under the extreme front transverse member 83, and a reinforcing tube 97 is provided above the extreme rear transverse member 84.

The chassis according to the invention includes a main internal structure 2 placed inside a sealed hull 19, and external structural elements 3, 4, 5 extending outside the hull 19 and rigidly joined to the main internal structure 2 through the hull 19 by sealed means 20, 21, 22, 23, 24, 25 for rigid joining. What is more, according to the invention, the sealed hull 19 which makes the vehicle 1 buoyant is rigidly joined to the main internal structure 2 of the chassis by and solely by these rigid sealed joining means which include clamping means for wedging this hull 19 between the external structural elements 3, 4, 5 and the main internal structure 2. These sealed means 20 to 25 for rigid joining are, according to the invention, point means for rigidly joining—particularly by bolting—the external structural elements 3, 4, 5 to the main internal structure 2. What is more, sealing may be produced by virtue of at least one O-ring 26 interposed between each external structural element 3, 4 and the hull 19 and/or 27 interposed between the hull 19 and the main internal structure 2.

The external structural elements include the front cradle 3 and the rear cradle 4 which are rigidly joined under the main internal structure 2, and carrying suspension linkages 28 of the wheels 14, 15. Each cradle 3, 4 is rigidly joined to the main internal structure 2 of the chassis on the one hand by an upper suspension mounting plate 29, 30 fixed by four bolts 99, 24 to a receiving mounting plate 31, 32 itself rigidly joined to the main internal structure 2 and, on the other hand, by two attachment lugs 33, 34, each of them being fixed by a bolt 23, 25 respectively to an anchoring bracket 35, 36 of the main structure 2. The suspension mounting plates 29, 30 of the cradles 3, 4 as well as the receiving mounting plates 31, 32 rigidly joined to the main structure 2 extend at least substantially horizontally. The bolts 99, 24 for fixing these mounting plates extend at least substantially vertically through the hull 19 which is wedged between the suspension mounting plate of the front cradle 3 and the front receiving mounting plate 31, and between the rear suspension mounting plate 30 of the rear cradle 4 and the corresponding rear receiving mounting plate 32. The suspension mounting plates 29, 30 of the cradles 3, 4 are raised up with respect to the main horizontal plane defined by each cradle 3, 4. The front suspension mounting plate 29 is connected to the front part of the front cradle 3 by a support 37 formed of uprights in the form of perforated plates. The suspension mounting plate 30 of the rear cradle 4 is connected to the rear part of this rear cradle 4 by a support 38 formed in the same way. The attachment lugs 33, 34 are fitted to the most central part of each cradle 3, 4 and extend longitudinally in projection with respect to each cradle 3, 4 toward the centre of the vehicle, that is to say toward the front for the rear cradle 4 and toward the rear for the front cradle 3.

Figure 8:
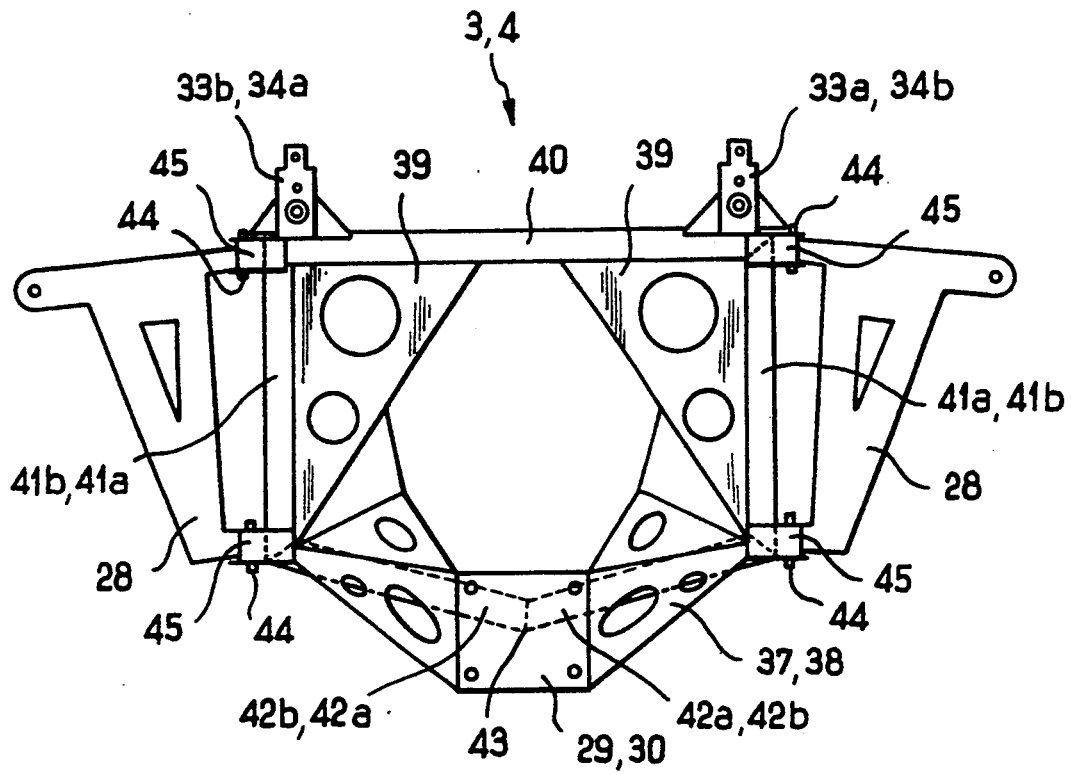
FIG. 8 is a plan view of a cradle of a chassis according to the invention with the suspension linkages.

The two cradles 3, 4 are made up in an identical way (FIG. 8) from a tubular frame in the general form of a pentagon reinforced by two perforated horizontal lateral plates 39. The tubular frame of each cradle 3, 4 consists of a transverse member 40 carrying the attachment lugs 33, 34, two tubular longitudinal members 41a, 41b, and two extreme transverse members 42a, 42b which are inclined to form an extreme apex 43. The transverse member 40 of the front cradle 3 carrying the attachment lugs 33 constitutes the rearmost part of this cradle 3. Reciprocally the transverse member 40 carrying the attachment lugs 34 of the rear cradle 4 constitutes the foremost part of the rear cradle 4. The attachment lugs extend at least substantially in the extension of the longitudinal members 41a, 41b and therefore in the general plane formed by the tubular frame 40, 41a, 41b, 42a, 42b. Each cradle includes a left-hand attachment lug 33a, 34a, and a right-hand attachment lug 33b, 34b. The attachment lugs 33, 34 are preferably provided with vibration damping devices.

The suspension linkages 28 are fixed by longitudinal spindles 44 to fixing lugs 45 fitted securely to the tubular frame of the cradle, at each end of each longitudinal member 41a, 41b. Thus, according to the invention, each axle 6; 7 of the vehicle is carried by a cradle 3, 4 outside the sealed hull 19, including the transmission differentials 8, 9. In that way, solely the primary front and rear transmission shafts 10, 11 pass through the hull 19. In FIG. 5, the hull portion 19 interposed between the rear cradle 4 and the main internal structure 2 has been represented in section. In FIG. 1, solely the hull portion 19 traversed by the front primary transmission shaft 10 has been represented.

The front 31 and rear 32 mounting plates for receiving the suspension mounting plates 29, 30 of the cradles 3, 4 are centered along a median longitudinal axis of the vehicle and are themselves carried by support brackets 46, 47 located at the lower extreme front part and upper extreme rear part respectively of the main internal structure 2.

In the embodiment shown, the front bracket 46 is double and is outside the hull 19. It therefore constitutes an external structural element. It is joined to the internal structure 2 by horizontal screws 22, the hull 19 being interposed between each bracket 46a, 46b and the front end 85 of the front longitudinal member 77 and/or the front reinforcing tube 96 which carries a tapping for receiving each screw 22. In FIG. 3, the hull 19 interposed between each front bracket 46a, 46b of the structure 2 is not represented for greater clarity.

The hull 19 is moreover interposed between the rear suspension mounting plate 30 and the receiving mounting plate 32 which are connected to one another by the bolts 24 extending vertically which form the said sealed means 24 for rigid joining.

According to the invention, the external structural elements 3, 4 of the chassis carry the axles 6, 7, the wheels 14, 15 and the suspensions of the vehicle. The front and rear cradles 3, 4 carry the front and rear axles 6, 7 as already stated and, in part, the wheels 14, 15 by virtue of the suspension linkages 28.

The external structural elements 3, 4, 5 moreover include two longitudinal lateral beams 5, namely a left-hand longitudinal lateral beam 5a and a right-hand longitudinal lateral beam 5b. Each longitudinal lateral beam is rigidly joined to the main internal structure 2 by each of its front 49 and rear 50 ends and by its central part 51.

Each longitudinal lateral beam 5 is attached to one side of the main internal structure 2 to form the lateral peripheral element of the chassis by extending over the entire length of the chassis between the two axles 6, 7. Each longitudinal lateral beam 5 therefore extends between a front wheel 14 and a rear wheel 15, and defines a suitable housing at each of its ends for the passage and deflection of the wheels 14, 15.

Figure 9:
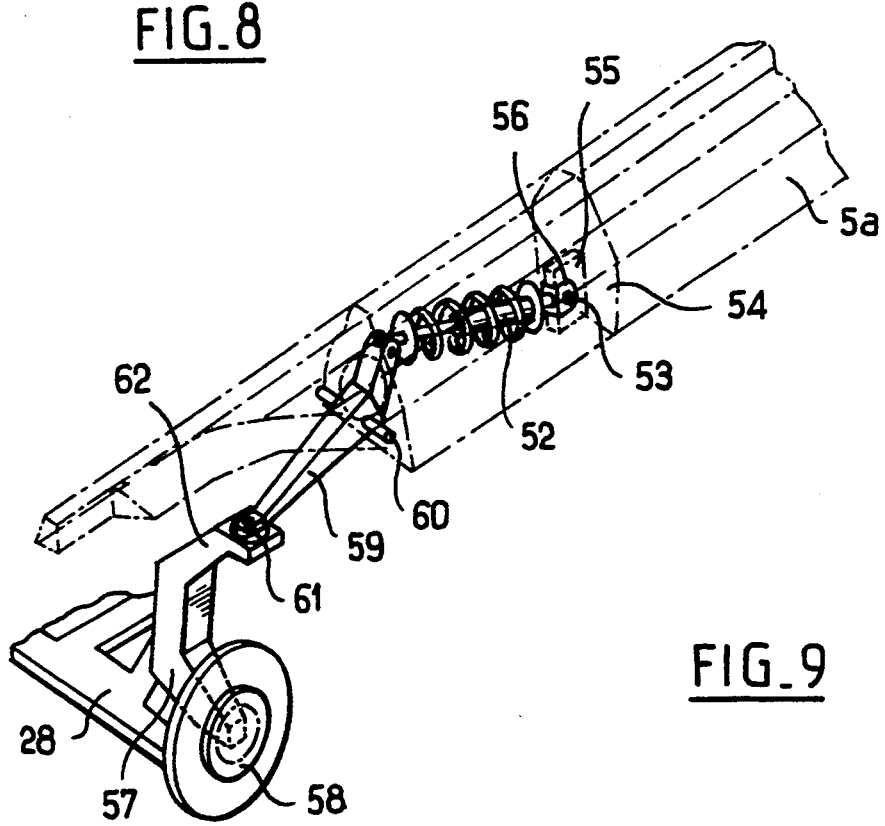
FIG. 9 is a partial perspective view illustrating the fitting of a wheel with its suspension to a chassis according to the invention.

The longitudinal lateral beams 5 carry the suspension elements of the vehicle, that is to say that each longitudinal lateral beam 5 carries a vehicle wheel shock absorber 52 at each of its ends, that is to say a front wheel shock absorber and a rear wheel shock absorber. In FIG. 9, the way in which the left-hand front wheel 14a is mounted with respect to the left-hand longitudinal lateral beam 5a is represented. Each wheel shock absorber 52 is fixed inside the hollow longitudinal lateral beam 5a and extends at least substantially longitudinally. The shock absorber 52 includes a shock absorber element as well as a return compression spring. The cylinder of the shock absorber element is connected by a horizontal transverse spindle 53 to a transverse wall 54 of the beam 5a which includes a longitudinal flat 55 about which a clevis 56 of the shock absorber element is engaged. The shock absorber 52 is connected at its other end to a suspension arm 57 which extends at least substantially vertically and which carries the wheel 14, 15 being rigidly joined to its hub 58. The shock absorber 52 is connected to this suspension arm 57 by means of a rocker 59 joined so that it can rotate freely with respect to the longitudinal lateral beam 5a about a horizonal transverse spindle 60. The rocker 59 includes a first arm rigidly joined by a ball joint 61 to the upper free end 62 of the suspension arm 57, and a second arm extending opposite the first arm with respect to the spindle 60, the end of which is connected to the other end of the shock absorber 52 about a horizontal transverse spindle. The horizontal transverse rotation spindle 60 of the rocker 59 is rigidly joined to the beam 5a. Thus, when the suspension arm 57 and the wheel move vertically, the rocker 59 pivots about the spindle 60 and causes the shock absorber 52 to be compressed or extended. Such a longitudinal arrangement of the shock absorber 52 makes it possible in particular to save a significant amount of space.

Figure 7:
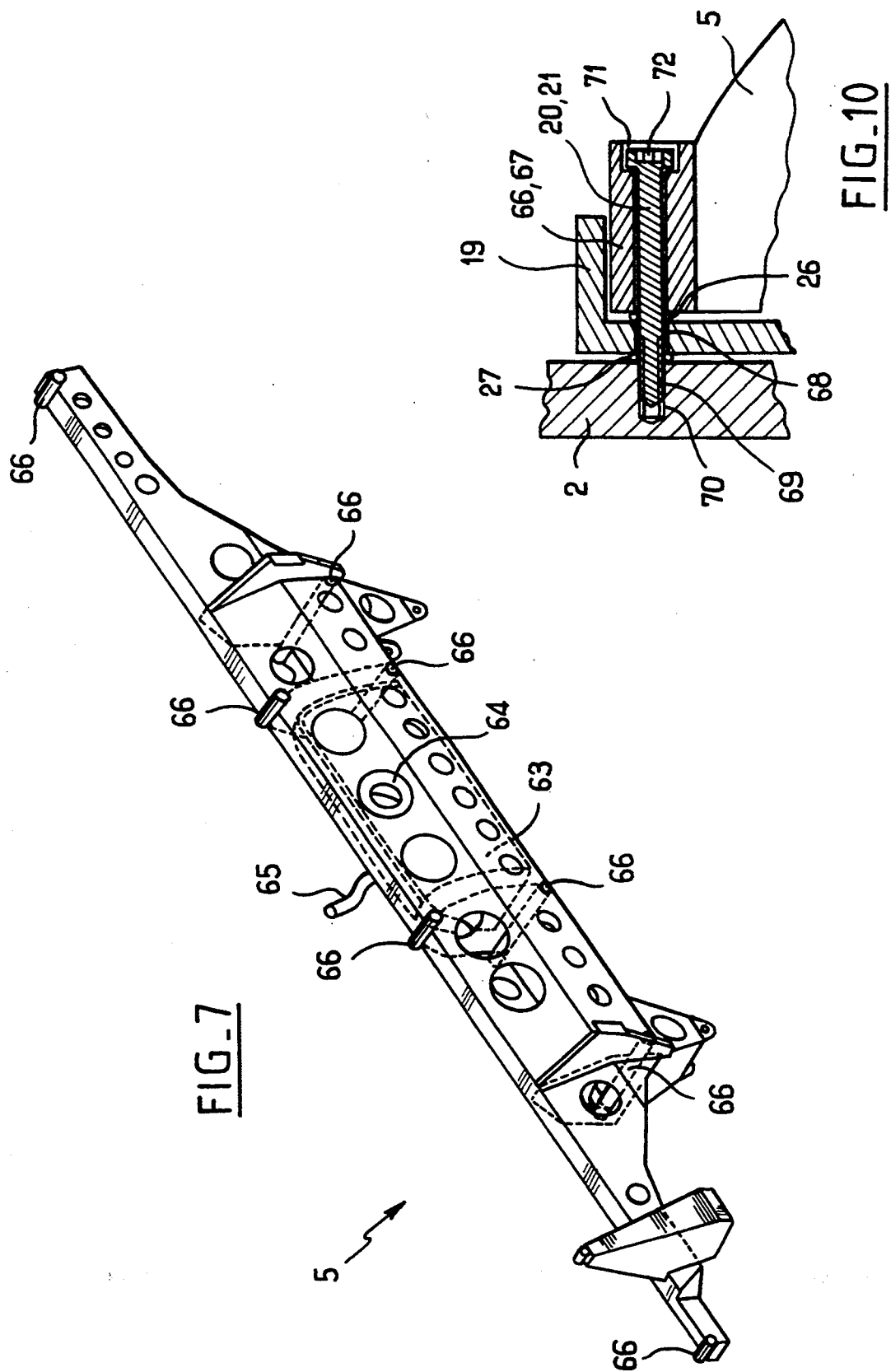
FIG. 7 is a perspective view of a longitudinal lateral beam of a chassis according to the invention.

The external structural elements 3, 4, 5 of a chassis according to the invention also carry at least one fuel tank 63. In the embodiment represented (FIG. 7), two tanks are provided and each tank 63 is inserted respectively inside each longitudinal lateral beam 5, in its central part 51. On the outer side, the beam 5 includes a slot 64 for access to the stopper of the tank and the tank 63 communicates with the motor unit inside the hull 19 by means of a hose 65 which leaves the inner side of the beam 5 and passes through the hull 19. Such a tank inserted into a hollow bevy 48 may consist of a flexible tank, in a way known per se.

Each longitudinal lateral beam 5 consists of plates of sheet metal which are folded and perforated.

FIG. 10 illustrates, in detail, the sealed means for rigidly joining a longitudinal lateral beam 5 to the main internal structure 2. Each longitudinal lateral beam 5 includes four fixing cylinders 66 extending transversely and evenly distributed along the upper longitudinal edge of the beam 5, and four fixing cylinders 67 evenly distributed along the longitudinal lower edge of the beam 5. Each cylinder 66, 67 includes a hollow bore through which a screw 20, 21 is engaged. This screw 20, 21 passes through a cylindrical slot 68 formed through the hull 19 so that the free end of the screw 20, 21, which is provided with a screw thread 69, is engaged in a tapped hole 70 formed in the main structure 2. The cylinder 66, 67 includes a housing 71 for receiving the head 72 of the screw. An external sealing gasket 26 is interposed between each cylinder 66, 67 and the slot 68 in the hull 19 and an internal sealing gasket 27 is interposed between the slot 68 in the hull 19 and the emerging end of the tapping 70. The hull 19 is therefore wedged and held between each cylinder 66, 67 and the main internal structure 2 by virtue of the screws 20, 21. A screw 20 is engaged into each upper fixing cylinder 66 of the beam 5 and a screw 21 is engaged in each lower fixing cylinder 67 of the beam 5. Each beam 5 includes at least one fixing cylinder 66 at each of its free ends 49, 50. Moreover, each lateral beam 5 also includes extensions 73 for fixing the bodywork 18 of the vehicle.

The upper rectangular tubular frame 95 rigidly joined above the central box structure 74 includes tappings 70 for receiving the upper screws 30 for rigidly joining the longitudinal lateral beams 5. The tapping 70 for the lower screws 21 for rigidly joining the longitudinal lateral beams 5 are formed in the longitudinal sides 88a, 88b of the skeleton 87. The front reinforcing tube 96 of the extreme front transverse member 83 and the rear reinforcing tube 97 of the extreme rear transverse member 84 also carry tappings 70 for receiving extreme upper screws 20 for rigidly joining each longitudinal lateral beam 5. Thus, the central part 51 of each longitudinal lateral beam 5 is rigidly joined to the central box structure 74 in the vicinity of or at the central transverse members 75, 76 because the tappings 70 are formed in the frame 95 opposite or in the vicinity of each central transverse member 75, 76. Also, in a chassis according to the invention, each longitudinal lateral beam 5 is rigidly joined to each transverse member 75, 76, 83, 84 of the main internal structure, this being by means of the rectangular frame 95 and the reinforcing tubes 96, 97.

Thus, for each lateral beam 5 an extreme front fixing screw, an extreme rear fixing screw, two screws for fixing to the upper rectangular tubular frame 95 in the upper part of each central transverse member 75, 76, two screws for fixing opposite the front and rear central transverse reinforcements 92, 93 (that is to say in the lower part of each central transverse member 75, 76), one screw for fixing opposite the front side 89 of the tubular skeleton 87, and one screw for fixing opposite the rear transverse reinforcement 94 of the skeleton 87 are provided.

According to the invention, the hull 19 is also joined by bonding or welding, that is to say by surface joining means, to the main internal structure 2 and/or to the external structural elements 3, 4, 5. For example, the hull is bonded along each longitudinal side 88a, 88b of the lower skeleton.

The front and rear cradles 3, 4 are joined to the main internal structure by screws or bolts 22, 23, 24, 25 in a similar way to the beams 5, that is to say with external and internal sealing gaskets on either side of the hull 19.

For fixing the rear cradle 4, the rear end of the rear longitudinal member 78 is extended downward to carry the rear receiving mounting plate 32 (FIGS. 3 and 5).

The extreme front transverse member 83 is raised up with respect to the overall horizontal plane of the central box structure 74 and of the front and rear longitudinal members 77, 78 so as to be able to support the control mechanism of a retractable windscreen and the weight of the various accessories of the driving position. This extreme front transverse member 83 includes a longitudinal recess 98 for receiving the mechanism for controlling the windscreen and is extended downward by the double bracket 43 which carries the front receiving mounting plate 31 to carry the front cradle 3. The two plates of sheet metal 46a, 46b constituting this bracket 46 are extended downward to a fixing point 48a, 48b for a thrust cylinder for controlling the mechanism for retracting the windscreen.

Figure 2:
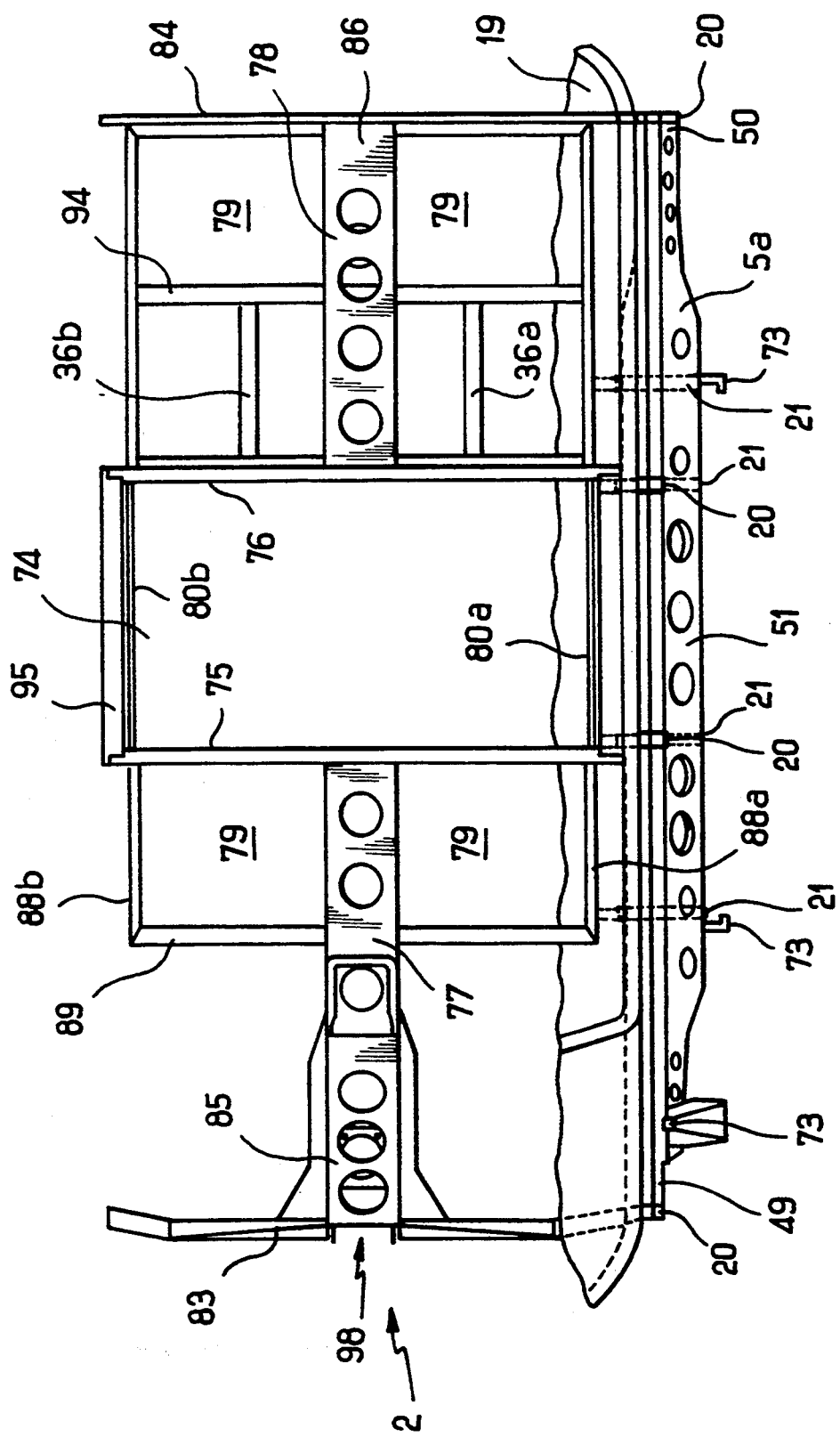
FIG. 2 is a plan view of a main structure and of a longitudinal lateral beam of a chassis according to the invention.

In FIG. 2, solely a portion of the hull 19 has been represented and solely the left-hand longitudinal lateral beam 5a has been represented. Of course, the chassis according to the invention also includes a right-hand longitudinal lateral beam 5b, in a perfectly symmetrical way.

The chassis according to the invention is produced overall by a mechanically joined structure based on tubes of square cross-section (having a side of 2 to 5 centimeters for example) for the skeleton 87, the upper frame 95 and the extreme transverse reinforcements 96, 97, and of plates of sheet metal which are folded and perforated, as previously described. The longitudinal members 77, 78, 80a, 80b, the central box structure 74 and the extreme transverse members 83, 84 have a height which is, for example, of the order of 10 to 30 cm.

The bodywork 18 surrounds the chassis and is rigidly joined to the upper part of the main internal structure 2 and to the external structural elements 3, 4, 5, particularly to the longitudinal lateral beams 5. The bodywork 18 therefore extends globally above and on either side of the chassis, whereas the hull 19 extends globally below and on each side of the chassis.

I claim:

1. An amphibious motor vehicle chassis which comprises a central box structure (74) defining therein a space for receiving a motor unit and protecting the motor unit against front, rear and lateral shocks, this box being defined at least toward the front and toward the rear by two central transverse members (75, 76), the chassis comprising at least one front longitudinal member (77) and at least one rear longitudinal member (78) which extend in the median longitudinal vertical plane of the vehicle on either side of the central box structure and which are respectively rigidly joined to each transverse member (75, 76) of the central box structure (74) to define two lateral spaces (79) for the reception therein of seat places on each side of each longitudinal member (77, 78) to the front and to the rear of the central box structure (74) to protect each said seat place against shocks from the sides of the corresponding transverse and longitudinal members.

2. The chassis as claimed in claim 1, wherein the central transverse members (75, 76) are connected to one another by two lateral longitudinal members (80a, 80b) extending between the ends (81a, 82a, 81b, 82b) of the central transverse members (75, 76) to join them together by extending them over the same height, so as to form the central box structure (74).

3. The chassis as claimed in claim 1, wherein each front and rear longitudinal member (77, 78) consists of a beam produced overall from a plate of sheet metal folded along longitudinal fold lines.

4. The chassis as claimed in claim 1, wherein each front and rear longitudinal member (77, 78) has a right transverse section of the same height as that of the central transverse member (75, 76) to which it is rigidly joined.

5. The chassis as claimed in claim 1, wherein each front and rear longitudinal member (77, 78) has a right transverse section in the shape of a U, a rectangle or a square.

6. The chassis as claimed in claim 1, wherein each central transverse member (75, 76) overall consists of a plate of sheet metal couched on edge so as to form a vertical transverse wall extending over the entire width of the vehicle.

7. The chassis as claimed in claim 1, wherein it includes an extreme front transverse member (83) rigidly joined to the front end (85) of said front longitudinal member (77), and an extreme rear transverse member (84) rigidly joined to the rear end (86) of said rear longitudinal member (78).

8. The chassis as claimed in claim 7, wherein the central box structure (74), the front and rear longitudinal members (77, 78) and the extreme transverse members (83, 84) consist of plates of sheet metal which are folded and perforated.

9. The chassis as claimed in claim 1, wherein it includes a tubular lower skeleton (87) rigidly joined under the central box structure (74), the longitudinal members (77, 78) and the transverse members (75, 76).

10. The chassis as claimed in claim 9, wherein the tubular lower skeleton (87) includes an overall rectangular frame (88a, 88b, 89, 90) and transverse reinforcements (92, 93, 94).

11. The chassis as claimed in claim 10, wherein two transverse reinforcements (92, 93) extend under the central transverse members (75, 76), and wherein lateral longitudinal members (80a, 80b) rest on longitudinal sides (88a, 88b) of the frame formed by the lower tubular skeleton (87).

12. The chassis as claimed in claim 11, wherein the lower tubular skeleton (87) includes front and rear brackets (35, 36) for anchoring a front cradle (3) and a rear cradle (4).

13. An amphibious motor vehicle, wherein it includes a chassis as claimed in claim 1.

14. The vehicle as claimed in claim 13, wherein it includes bodywork (18) surrounding said chassis and rigidly joined to an upper part of a main internal structure (2) and to external structural elements (3, 5; 4, 5).

15. An amphibious motor vehicle having a chassis which comprises a main internal structure (2) placed inside a sealed hull (19), and external structural elements (3, 4, 5) extending outside the hull (19) and rigidly joined to the main internal structure (2) through the hull (19) by sealed means (20, 21, 22, 23, 24, 25) for rigid joining, the vehicle having axles (6, 7), wheels (14, 15) and suspensions carried by said external elements and extending fully outside the hull, wherein the hull (19) is rigidly joined to the main internal structure (2) by the sealed means (20 to 25) for rigid joining which include clamping means for wedging the hull (19) between the external structural elements (3, 4, 5) and the main internal structure (2).

16. An amphibious motor vehicle having a chassis which comprises a main internal structure (2) placed inside a sealed hull (19), and external structural elements (3, 4, 5) extending outside the hull (19) and rigidly joined to the main internal structure (2) through the hull (19) by sealed means (20, 21, 22, 23, 24, 25) for rigid joining, the vehicle having axles (6, 7), wheels (14, 15) and suspensions carried by said external elements and extending fully outside the hull, wherein the external structural elements (3, 4, 5) include two longitudinal lateral beams (5) and wherein each longitudinal lateral beam (5) is rigidly joined to the main internal structure (2) by each of its front (49) and rear (50) ends and by its central part (51).

17. The chassis as claimed in claim 16, wherein the central part (51) of each longitudinal lateral beam (5) is rigidly joined to each of a plurality of central transverse member (75, 76).

18. An amphibious motor vehicle having a chassis which comprises a main internal structure (2) placed inside a sealed hull (19), and external structural elements (3, 4, 5) extending outside the hull (19) and rigidly joined to the main internal structure (2) through the hull (19) by sealed means (20, 21, 22, 23, 24, 25) for rigid joining, the vehicle having axles (6, 7), wheels (14, 15) and suspensions carried by said external elements and extending fully outside the hull, wherein the external structural elements (3, 4, 5) include two longitudinal lateral beams (5), and wherein each longitudinal lateral beam (5) is rigidly joined to each of a plurality of transverse members (75, 76, 83, 84) of the main internal structure (2).

19. An amphibious motor vehicle having a chassis which comprises a main internal structure (2) placed inside a sealed hull (19), and external structural elements (3, 4, 5) extending outside the hull (19) and rigidly joined to the main internal structure (2) through the hull (19) by sealed means (20, 21, 22, 23, 24, 25) for rigid joining, the vehicle having axles (6, 7), wheels (14, 15) and suspensions carried by said external elements and extending fully outside the hull, wherein the external structural elements (3, 4, 5) include two longitudinal lateral beams (5), wherein each longitudinal lateral beam (5) carries shock absorbers (52) of the vehicle wheel, and wherein each wheel shock absorber (52) is fixed inside a hollow said longitudinal lateral beam (5) and is connected to an at least substantially vertical suspension arm (57) carrying a wheel (14, 15) by means of a rocker (59) joined so that it can rotate freely with respect to the longitudinal lateral beam (5) about a horizontal transverse spindle (60).

20. An amphibious motor vehicle having a chassis which comprises a main internal structure (2) placed inside a sealed hull (19), and external structural elements (3, 4, 5) extending outside the hull (19) and rigidly joined to the main internal structure (2) through the hull (19) by sealed means (20, 21, 22, 23, 24, 25) for rigid joining, the vehicle having axles (6, 7), wheels (14, 15) and suspensions carried by said external elements and extending fully outside the hull, wherein the external structural elements (3, 4) include a front cradle (3) and a rear cradle (4) which are rigidly joined under the main internal structure (2) and carry suspension linkages (28) for the wheels (14, 15).

21. The chassis as claimed in claim 20, wherein each cradle (3, 4) carries a transmission differential (8, 9) connected to a primary transmission shaft (10, 11) passing through the hull (19) coming from a motor unit, two secondary transmission shafts (12, 13) with universal joints transmitting the movement to the wheels (14, 15) from the differential (8, 9).

* * * * *